United States Patent [19]

Shellhause

[11] 3,898,914

[45] Aug. 12, 1975

[54] HYDRAULIC BRAKE BOOSTER ASSEMBLY

[75] Inventor: Ronald L. Shellhause, Vandalia, Ohio

[73] Assignee: General Motors Corporation, Detroit, Mich.

[22] Filed: July 18, 1974

[21] Appl. No.: 489,497

[52] U.S. Cl.............. 91/375 R; 91/391 R; 91/450
[51] Int. Cl.² ........................................ F15B 9/10
[58] Field of Search.......... 91/375 R, 375 A, 391 R, 91/450

[56] References Cited
UNITED STATES PATENTS

| | | | |
|---|---|---|---|
| 2,730,074 | 1/1956 | Ernst | 91/375 |
| 2,939,429 | 6/1960 | Charlson | 91/375 |
| 3,033,051 | 5/1962 | Reinke et al. | 91/375 A |
| 3,557,662 | 1/1971 | Adams | 91/375 R |
| 3,733,968 | 5/1973 | Bach | 91/391 R |

Primary Examiner—Paul E. Maslousky
Attorney, Agent, or Firm—D. D. McGraw

[57] ABSTRACT

A hydraulic brake booster assembly having a rotary control valve arrangement including concentric valve members which are rotatable relative to each other and to the valve housing. One valve member is driven by an input member and the other valve member is driven by an extension provided as a portion of the power piston assembly. The valve assembly is perpendicularly skew to the axially aligned booster input member and piston assembly. Friction driving surfaces are provided for the valve members. The piston assembly includes a hydraulic lock arrangement activated upon booster runout by driving the piston extension through the rotary valve assembly to hydraulically trap fluid in a locked chamber to provide for mechanical force transmission from the input member to the booster output member. The friction drive is arranged to slip during manual push-through to permit the valve members to remain in proper indexed relation during this portion of the operation. An index ball, ramp and stop construction between the two valve members is utilized to maintain the proper indexing relationship. The valve assembly permits the operation of the booster in a hydraulic system including other hydraulically actuated mechanisms such as a power steering gear. It provides for booster operation by an accumulator when needed. It provides for charging of the accumulator during normal power brake apply operations.

4 Claims, 10 Drawing Figures

PATENTED AUG 12 1975
3,898,914
SHEET 1
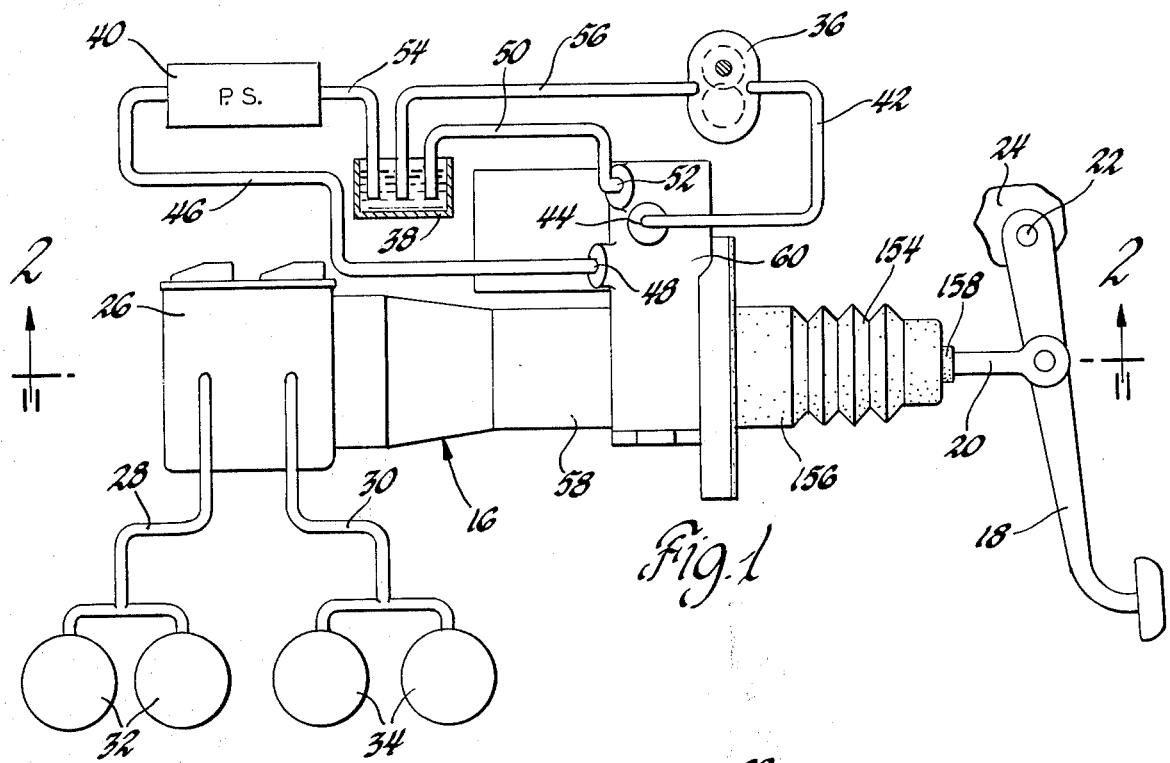
Fig.1
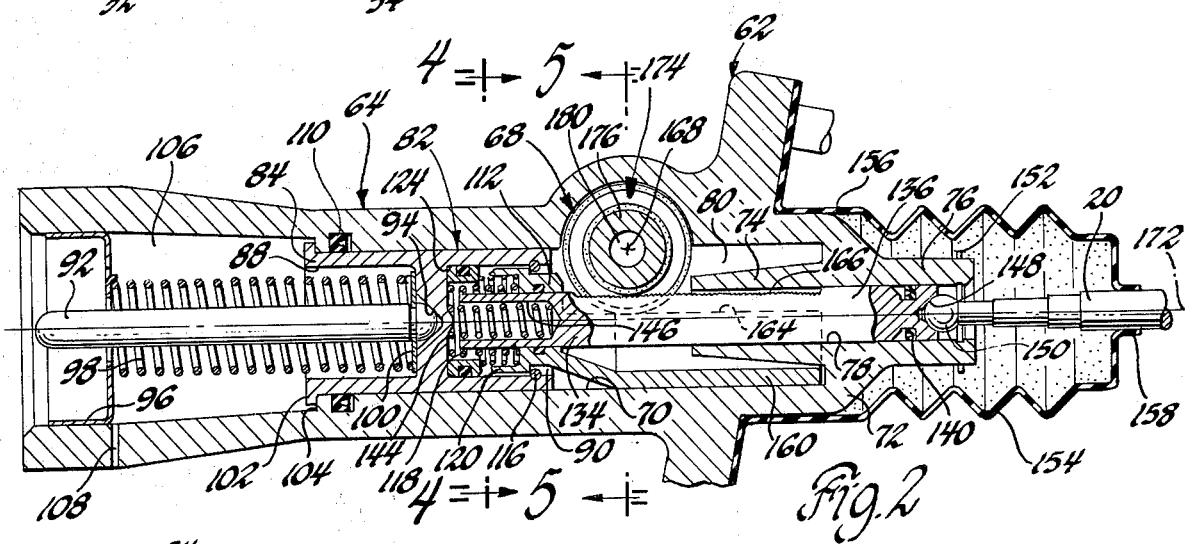
Fig.2
Fig.3
Fig.4

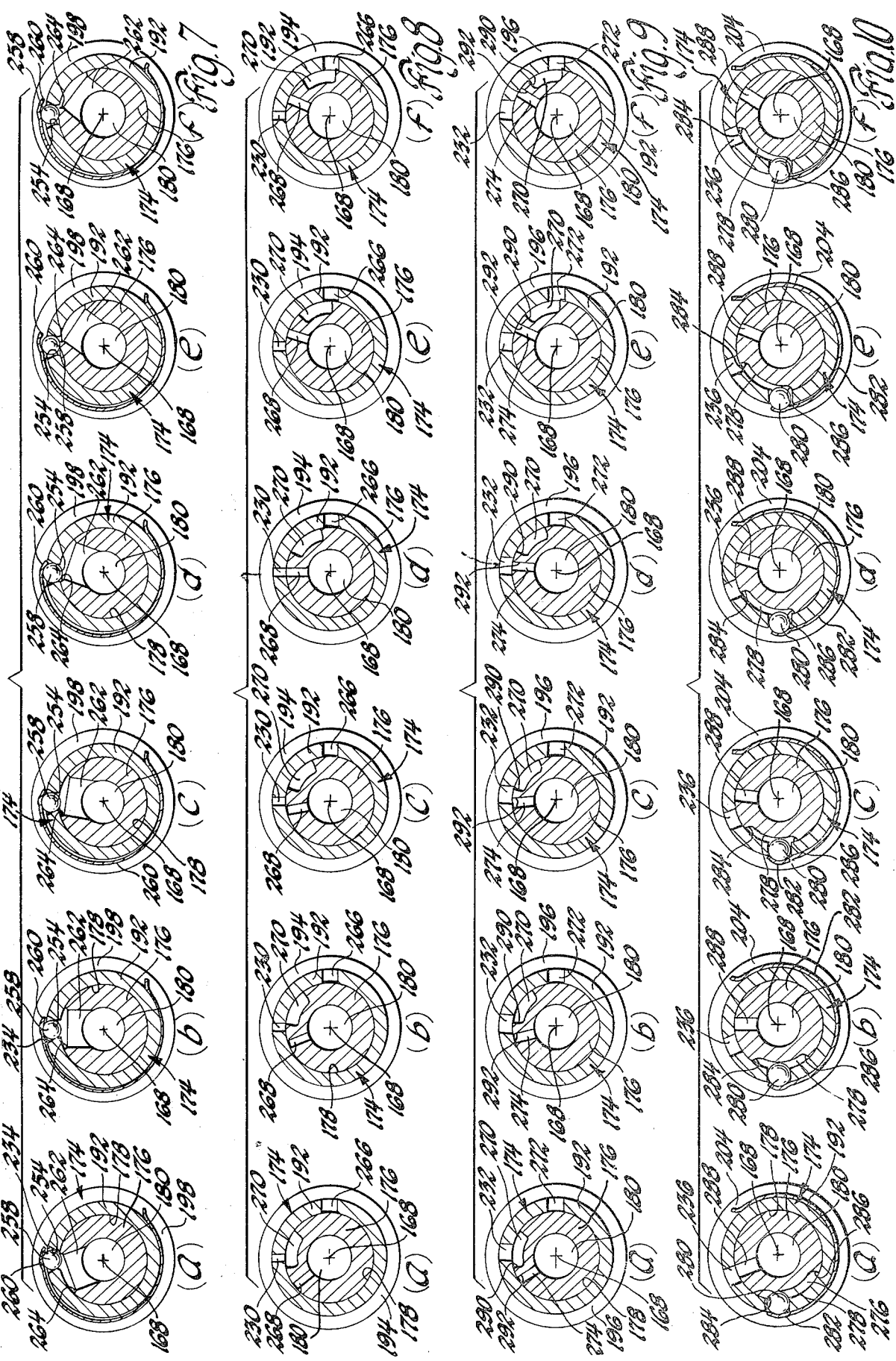

HYDRAULIC BRAKE BOOSTER ASSEMBLY

The invention relates to a hydraulic power booster assembly and more particularly to one having a rotary valve control system. It is a feature of the invention that the rotary valve assembly for controlling the booster includes two relatively movable valve members which are indexed in relation to each other at the beginning and near the end of each full stroke of the booster input member. They are driven in a coordinated manner during intermediate stroke positions. They therefore retain their relationship even though the booster may be operated manually.

It is another feature of the invention to provide the valve members in a concentric arrangement within a valve housing bore and to rotationally drive the valve members through a connection of one valve member to the booster input member and a connection of the other valve member to a drive element responsive to movement of the booster output member.

It is a more particular feature of the invention to provide frictional drive elements for the valve members which during normal booster operation will move the valve members in the desired relative rotational manner for booster control. If the booster must be actuated manually after booster runout, the friction drive arrangement will operate to activate a hydraulic lock which effectively mechanically interconnects the booster input member and the booster output member for mechanical force transmission, after which further concurrent movements of the drive members cause the friction drive arrangement to slip while maintaining the valve members in their proper indexed relationship.

It is another feature of the invention to provide a hydraulic lock chamber into which the input member extends, the chamber being formed in a recess at the rear end of the power piston and controlled by a lock piston on an extension of which one of the valve drive members is formed. During normal operation the locked valve remains open so that the lock chamber is not sealed, thereby permitting some relative movement between booster input member and the power piston assembly in order to obtain desirable control. If it is required to actuate the hydraulic lock, the input member is moved relative to the power piston assembly, driving the lock piston through the valve member drives to close the lock valve. Thereafter, pressure is trapped in the lock chamber to provide what is effectively a mechanical link between the input member and the power piston for mechanical force transmission. The lock valve is opened immediately upon releasing movement of the input member.

Yet another feature of the invention is a seal and valve arrangement which prevents a low pressure lock of the booster assembly during manual operation when no supply fluid is available from the normal fluid supply. This arrangement connects the expanding power chamber, which is otherwise sealed off in this condition, with the sump containing a fluid supply which is pulled into the power chamber due to a negative pressure generation.

In the Drawings

FIG. 1 is a schematic illustration of a vehicle hydraulic power system including a hydraulic brake booster assembly embodying the invention.

FIG. 2 is a cross-section view of the hydraulic booster assembly of FIG. 1 taken in the direction of arrows 2—2 of that FIGURE and having parts broken away.

FIG. 3 is a fragmentary view of a portion of FIG. 2 illustrating the hydraulic lock arrangement in greater detail.

FIG. 4 is a cross-section view taken in the direction of arrows 4—4 of FIG. 2.

Figure 5:
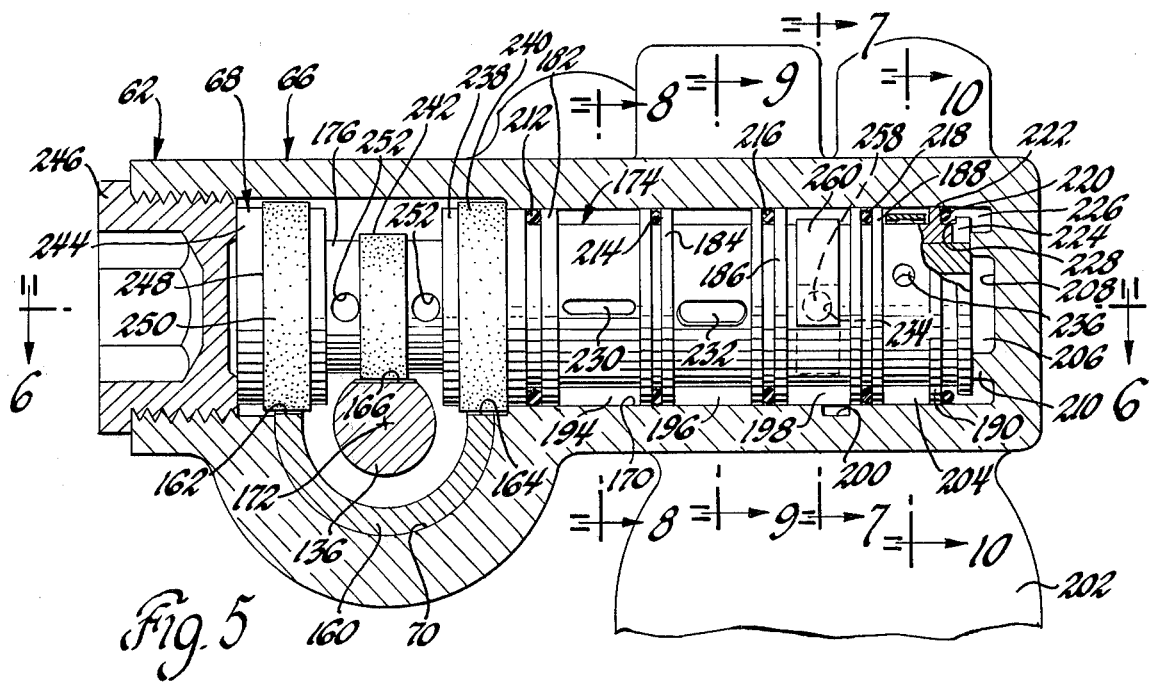
FIG. 5 is an enlarged cross-section view taken in the direction of arrows 5—5 of FIG. 2.
Figure 6:
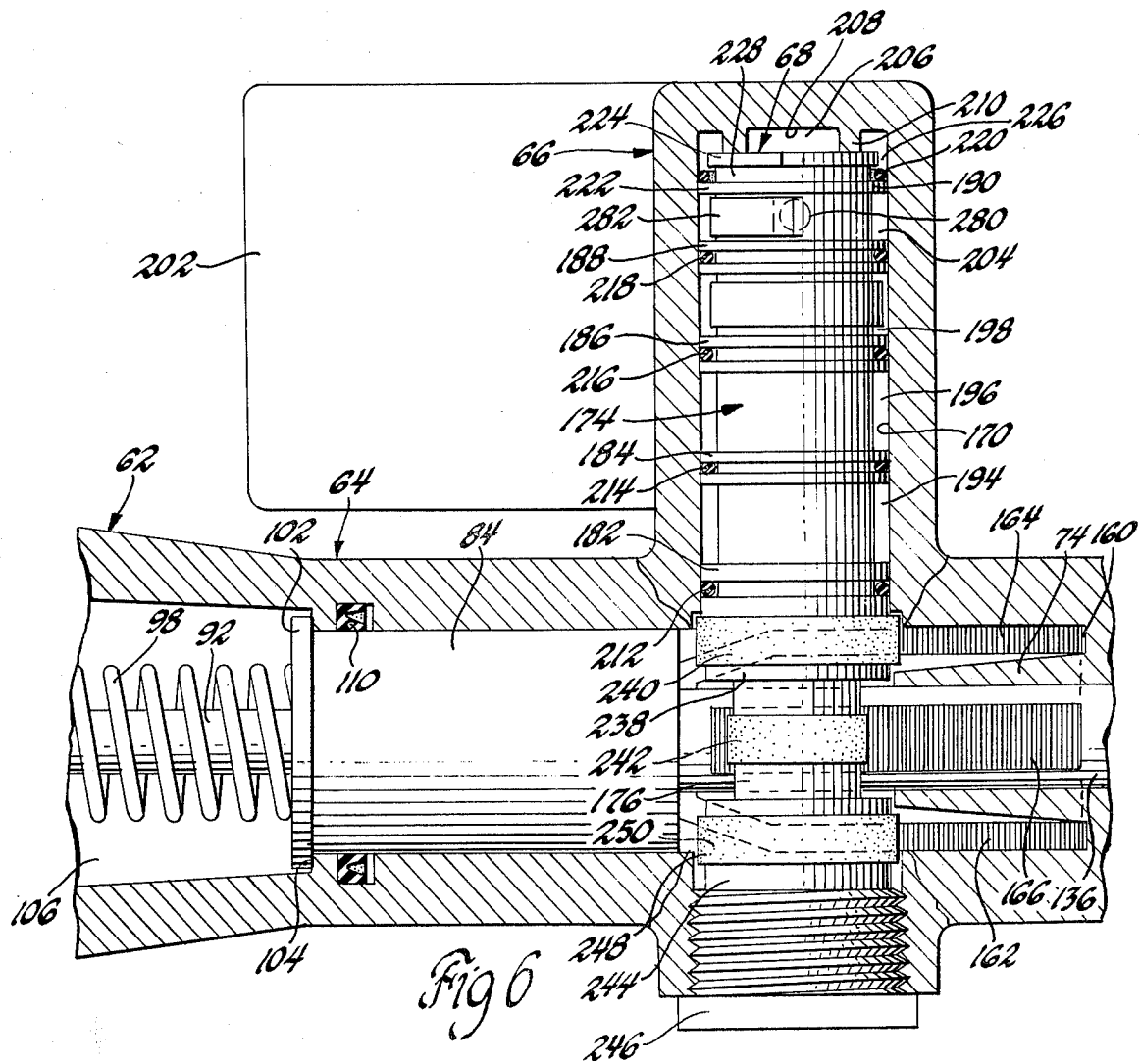
FIG. 6 is a cross-section view taken in the direction of arrows 6—6 of FIG. 5.

FIGS. 7 through 10 each have position sections $a$, $b$, $c$, $d$, $e$ and $f$ showing the relationships of the valve members in different operational cycle positions. FIG. 7 is taken in the direction of arrows 7—7 of FIG. 5; FIG. 8 is taken in the direction of arrows 8—8 of FIG. 5; FIG. 9 is taken in the direction of arrows 9—9 of FIG. 5; and FIG. 10 is taken in the direction of arrows 10—10 of FIG. 5.

The brake system illustrated in FIG. 1 includes a power booster 16 and a brake pedal lever 18 which is connected by push rod to actuate the booster asembly 16. The lever 18 is pivotally mounted at 22 to a suitable portion of the vehicle body 24. The booster assembly 16 is connected to the master cylinder assembly 26, which is illustrated as being of the dual pressurizing chamber type. It is connected to separate brake lines 28 and 30, with line 28 transmitting brake fluid to the front wheel brakes 32 and line 30 transmitting brake fluid to the rear wheel brakes 34. The booster assembly 16 is of the hydraulic pressure operated type and is connected in a hydraulic system which includes a pump 36 having a sump 38, and a power steering gear 40. The system as illustrated includes a conduit 42 connecting the output side of pump 36 to the booster pressure inlet 44, a conduit 46 connecting the booster outlet 48 to the inlet side of the power steering gear 40, a conduit 50 connecting the booster exhaust outlet 52 to the sump 38, a conduit 54 connecting the outlet side of the power steering gear 40 to the sump 38, and a conduit 56 connecting the sump 38 with the inlet side of pump 36.

The booster assembly 16 has a booster power section 58 and a control valve section 60. These sections are arranged transversely of each other, in a common housing 62, with the power section 58 being in axial alignment with the push rod 20 and the master cylinder assembly 26. The transverse arrangement of the control valve section 60 permits the use of a rotary control valve arrangement. The booster assembly inlet 44 and outlets 48 and 52 are provided as a part of the control valve section.

The power section portion of the booster is illustrated in greater detail in FIGS. 2, 3 and 4. The booster assembly housing 62 includes a housing power section 64 and a housing valve section 66. The latter section contains the valve assembly 68 which will be described in greater detail below.

The housing power section 64 has a bore 70 extending axially therethrough in linear alignment with the push rod 20 and the master cylinder assembly 26. The rear end of the bore has an apertured end wall 72 provided with forward and rearward wall extensions 74 and 76 through which a guide bore 78 extends. The forward extension 74 extends into the rear portion of bore 70 which forms the power chamber 80. The power piston assembly 82 is reciprocably mounted in bore 70 and defines the forward end of the power chamber 80 and is the movable wall of the power chamber. Power piston assembly 82 includes the power piston 84, which is provided with a center wall 86 dividing the inner portion of the piston into a forwardly opening recess 88 and a rearwardly opening recess 90. The forward portion of bore 70 has an output push rod 92 extending axially therethrough, the rear end of the push rod being positioned in a seat 94 formed on the forward side of wall 86 and the forward end being arranged to move linearly forward to actuate the pressurizing pistons of master cylinder assembly 26. A spring retainer 96 is fitted into the end portion of bore 70 through which push rod 92 extends and provides a seat for return spring 98. This spring is a compression spring which acts on a spring retainer 100 attached to the end of push rod 92 adjacent wall 86. Spring 98 therefore continually urges the push rod 92 and the power piston assembly 82 rearwardly. A flange 102 formed on the forward end of piston 84 mates with a shoulder 104 formed in bore 70 to establish the rearward position of power piston 84. The forward portion of bore 70 therefore includes a chamber 106, the rear wall of which is defined by the forward end of piston 84. This chamber is unpressurized and provides a buffer space between the master cylinder assembly and the hydraulic portions of the booster assembly. The chamber 106 may be suitably vented to atmosphere by drain port 108 so that any hydraulic fluid which passes power piston seal 110 from power chamber 80 cannot reach the master cylinder assembly 26. Spring retainer 96 will assist in maintaining the separation of any fluids leaked from either assembly by acting as a dam. A suitable drain may also be provided for the master cylinder assembly to prevent any brake fluid from passing into the booster assembly.

The piston assembly includes a lock piston 112 which is reciprocably mounted in recess 90 in non-sealing relation to the cylinder wall defined by the recess. The lock piston has a shoulder 114 which engages the lock ring 116 to establish the rearward position of the lock piston. A compression spring 118 is positioned within the recess 90 and acts on the forward side of lock piston 112 and the rear side of wall 86 to yieldingly hold the lock piston against ring 116 and to act as a lock piston return spring. The lock piston 112 has an annular section 120 extending forwardly and terminating in face valve 122. A face seal ring 124 is provided in the forward end of recess 90 and forms an annular lock valve which has an O-ring seal 126 in its outer periphery. A compression spring 128 extends between lock piston 112 and seal 124 and acts in the same direction as spring 118 as a lock valve return spring. The face valve 122 is engageable with the annular surface 130 of face seal ring 124 when the lock piston is moved forward relative to the power piston 84 against the forces of springs 118 and 128 so as to trap fluid in the chamber 132. This chamber is defined by piston 112, seal 124, the rear surface of wall 86, and the forward end 134 of the actuator or input member 136. Input member 136 is reciprocably mounted and guided in bore 78 and extends through power chamber 80 and an aperture 138 formed in lock piston 112. Seals 140 and 142 respectively seal the input member with bore 78 and lock piston 112. A compression spring 144 is mounted in a recess 146 formed in the forward end 134 of the input member and acts against wall 86 to provide an input member return spring. The input push rod 20 is seated in the recessed end 148 of the input member 136 with a ball and socket type connection. The ball end 150 of push rod 20 is retained within the bore 78 by a retainer clip 152. The open end of bore 78 into which push rod 20 extends is suitably protected by a flexible boot 154 which is sealingly secured at its forward end 156 to an outer portion of housing 62 and at its rear end 158 to push rod 20.

The lock piston 112 has a semi-cylindrical valve drive extension 160 which extends rearwardly into power chamber 80. The split line surfaces of the semi-cylindrical extension provide co-planar valve drive surfaces 162 and 164. A similar valve drive surface 166 is provided on the upper side of the input member 136 on a flat portion machined or otherwise formed thereon. Surface 166 extends from a point adjacent the forward end 134 of the input member to a point somewhat forward of seal 140. The lengths of the drive surfaces 162, 164 and 166 are in each instance sufficient to maintain a portion of each surface adjacent the valve assembly 68 at all times through the entire possible stroke of the input member 136 and the power piston assembly 82. The drive surfaces preferably operate frictionally as will be further described below in relation to the valve assembly 68. In the preferred embodiment the plane of drive surface 166 is parallel to but spaced from the plane of drive surfaces 162 and 164.

The valve assembly 68 has an axis 168 which is coincident with the axis of the bore 170 formed in the housing valve section 66. The common axis 172 of the input member 136 and the power piston assembly 82 extends linearly and coincident with the axis of the housing power section bore 70. Axes 168 and 172 are perpendicularly skew, with axis 168 being spaced above axis 172, as seen in FIG. 2. It can be observed that the planes containing the drive surfaces are also parallel to and spaced from axis 168 as well as being parallel to and, in some constructions within the purview of the invention, also spaced from axis 172. Bore 170 of the housing valve section intersects bore 70 of the housing power section in the power chamber 80 rearwardly of the rearwardmost position of power piston 84 and forwardly of the forward extension 74 of end wall 72.

The valve assembly 68 includes one sleeve valve forming an outer rotary valve member 174 and another sleeve valve forming an inner rotary valve member 176. The bore 178 of the outer valve member 174 provides a cylinder wall for the reception of the inner valve member 176. The bore 180 of the inner valve member 176 provides a passage through which hydraulic fluid flows to and from the power chamber 80 under control of the valve assembly.

The housing valve section 66 has ports 44, 48 and 52 as noted above. These ports provide fluid communication to bore 170 and are relatively circumferentially positioned so that suitable connections may be made. They are also axially so positioned that they connect with different axially spaced segments of bore 170. These segments are divided into separate chambers. The outer rotaty valving member 174 is formed as a sleeve type spool valve. It has a series of axially spaced lands thereon, five such lands 182, 184, 186, 188 and 190 being provided within the bore so that they are located within the cylindrical wall portion of bore 170. The lands are separated by groovves so that the lands and the valve body 192 and the cylindrical wall of bore 170 define axially spaced chambers. Chamber 194 is positioned between lands 182 and 184 and is connected to the port 48 leading to the power steering gear 40. Chamber 196 is positioned between lands 184 and 186 and is in fluid communication with the pump inlet port 44. Chamber 198 is positioned between lands 186 and 188 and is in fluid communication with an accumulator port 200. This port is internally formed in the particular construction illustrated, being machined in a portion of housing 62 so that it connects with the accumulator 202 to receive accumulator pressure and to provide for accumulator charge as described below. Chamber 204 is positioned between lands 188 and 190 and is in fluid communication with the outlet port 52 leading by way of conduit 50 to sump 38. The end chamber 206 is positioned between land 190 and the closed end 208 of bore 170. End wall 208 is provided with a castellated stop 210 which extends slightly into chamber 206.

Each land is provided with an O-ring seal which is a floating O-ring. Each seal fits the bore 170 but is clear at its internal diameter relative to the bottom of the groove of the land in which it is positioned. Therefore each seal is not under compression by the valve or the housing in any two planes and each seal rides under its own tension against the cylinder wall of bore 170. This provides very low friction loss while maintaining an adequate seal. Land 182 is provided with such a seal 212, land 184 is provided with such a seal 214, land 186 is provided with such a seal 216, land 188 is provided with such a seal 218, and land 190 is provided with such a seal 220. Land 190 is constructed with a seal groove which has only one side wall 222 formed as a part of the land extending radially outwardly to the bore 170. The other side wall 224, on the side of the land forming a part of chamber 206, is of a somewhat lesser diameter than bore 170 to provide an annular passage 226 thereabout. The groove 228 in which seal 220 is located is wider than the diameter of seal 220 so that the seal can move slightly in directions parallel to the bore axis 168. This arrangement utilizes seal 220 as a valve in order to prevent a vacuum from occurring in the power chamber, bore 180 and chamber 206 under certain conditions of operation as described below.

Ports 230, 232, 234, and 236 are formed through valve body 192 respectively intermediate the lands so that port 230 connects valve member bore 178 with chamber 194, port 232 connects valve bore 178 with chamber 196, port 234 connects valve bore 178 with chamber 198, and port 236 connects valve bore 178 with chamber 204.

The portion of the outer valve member 174 extending into power chamber 80 has a land 230 adjacent land 182. The outer valve drive member 240 is provided on land 238 and is in friction driving relation with drive surface 164 of extension 160 so that linear movement of extension 160 will cause rotary movement of the outer valve member 174. The drive member 240 may be of a rubber-like material and the drive surface acting upon it may have a suitable finish to provide for transmission of the necessary drive forces without slippage in normal operation. However, under certain conditions of operation some slippage is desirable to prevent binding and allow for manual push-through operation of the booster assembly.

The inner rotary valve member 176 is formed as a sleeve and fits in relatively rotatable sealing relation with the cylinder wall of bore 178. This is better seen in the segmental views of FIGS. 7 through 10. This valve member is somewhat longer than the outer valve member and extends transversely through much of the power chamber 80. The portion in the power chamber 80 has an inner valve drive member 242 formed thereon. This member may be a land provided with a suitable friction surface, or a rubber-like drive member secured about the inner valve member body in driving relation, or a combination of a land and such a drive member. When assembled, the friction surface of member 242 is in frictional drive relationship with the drive surface 166 of input member 136 as is clearly shown in FIGS. 2 and 5. The end 244 of valve member 176 is positioned adjacent the plug 246 closing the end of bore 170 on the other side of the power chamber from the main portion of the bore. This valve end has an idler roller 248 rotatably mounted thereon and provided with a drive surface 250 similar in nature to the drive surface of outer valve drive member 240. Drive surface 250 engages drive surface 162 so that the idler roller moves concurrently with the outer valve member in response to linear movement of valve drive extension 160. This permits a good balance of forces which maintains the friction drive while permitting slip under certain conditions when necessary. The dimensions of the inner and outer valve members and the space that they occupy are so arranged that the valve drive members are always in driving engagement with their respective drive surfaces while allowing for slippage under the conditions noted in the operational description.

The inner valve member 176 has ports 252 extending radially through the valve body on either side of drive member 242 so that the bore 180 is always connected through the ports to the power chamber 80. FIGS. 7 through 10 each shows six different relative positions of the inner and outer valve members which correspond to various operating conditions. The cross-section view of FIG. 7 is taken through the accumulator chamber 198. The cross-section view of FIG. 8 is taken through the power steering chamber 194. The cross-section view of FIG. 9 is taken through the pump inlet chamber 196. The cross-section view of FIG. 10 is taken through the sump chamber 204. These illustrations show an important feature of the invention which is that the relative positions of the inner and outer valve members, and only these relative positions, are pertinent to proper control. The particular position of the valve members insofar as the fixed housing bore 170 is concerned is of no particular consequences since in each instance the entire groove forming each chamber is open to the associated port through the housing section 66. It is for this reason that slippage can be allowed at the drive surface during manual push-through of the booster without upsetting the relative control positions of the inner and outer valve members since they have provision for maintaining their proper relationship.

The views labeled a in FIGS. 7 through 10 show the relative positions of the valve members when the booster is at rest and no brake application is made. This position occurs whether or not the pump 36 is operating. A valve seat 254 is formed in port 234 extending through the valve body 192 of the outer rotary valve member 174. Port 234 is so arranged that it is larger at the outer periphery of valve body 192 than at the surface of the bore 178 to provide the valve seat. A ball valve 258 fits in port 234 and is normally held seated on valve seat 254 by spring clip 260. The inner rotary valve member 176 has a port 262 extending radially outwardly from bore 180 through the valve body and opening into bore 178. The outer edge of the port 262 is illustrated as being slightly beveled at 264 and at one circumferential point the bevel 264 is in engagement with or immediately adjacent ball valve 258. However, there is no force exerted by bevel 264 on ball valve 258 at this time and the ball remains seated during the first portions of the cycle described below in greater detail. The diametrically opposite point of bevel 264 is arranged to engage the ball valve 258 at the appropriate time when sufficient movement of the inner rotary valve member has occurred in relation to the outer rotary valve member, this movement being clockwise as seen in FIG. 7. The same edge of bevel 264 also becomes one of the control valve elements which meters accumulator pressure when the accumulator is to be activated. This is described below.

The portion of the valve assembly illustrated in FIG. 8 includes the slot port 230 which extends through the valve body 192 of the outer rotary valve member 174 and communicates chamber 194 with the outer valve member bore 178. As seen in FIG. 8, another port 266, which is somewhat larger than port 230, similarly extends radially through the valve body 192 and provides fluid communication between bore 178 and chamber 194. Port 266 is positioned in a proper timing relation for reasons to be described which is circumferentially approximately 90° in a clockwise direction from port 230. The inner valve assembly has a circular port 268 which provides a restriction during pump bypass after runout as is described below with regard to the operation as it reaches position $d$. A channel 270 is formed in the outer surface of the inner valve member and extends axially through the linear lengths of slot 230 and slot 232. It extends circumferentially for a somewhat greater arcuate distance than do slots 230 and 232, as seen in FIG. 8. When the valve assembly is in the rest position $a$ shown, slot 230 is in full fluid communication with the left portion of channel 270. The channel is not in fluid communication with port 266 under this condition of operation.

As seen in FIG. 9 (a), channel 270 is also in full fluid communication with slot port 232. This slot port extends radially through the valve body 192 so that it provides fluid communication between chamber 196 and bore 178. A port 272 is also provided in valve body 192 and radially connects chamber 196 and bore 178. Port 272 is arcuately positioned clockwise relative to slot port 232 in the manner illustrated in FIG. 9. A circular port 274 is radially provided in the inner valve member 176 adjacent channel 270, the arcuate distance between the left arcuate edge of channel 270 and the right arcuate edge of port 274 preferably being a slightly lesser distance than the arcuate width of slot port 232, as seen in FIG. 9, With the assembly in the rest position $a$, slot port 232 is in full fluid communication with channel 270 and ports 272 and 274 are closed.

FIG. 10 shows the circular port 236 extending radially through the valve body 192 to provide fluid communication between chamber 204 and bore 178. A recess 276 is also provided in the valve body 192 and particularly in the portion thereof between lands 188 and 190. The bottom of recess 276, which is radially inward, provides a ramp 278 with the clockwise portion of the ramp being formed radially inward to a greater extent than the other portions of the ramp so that the ramp rises radially as it extends counterclockwise as viewed in FIG. 10. The recess is of a sufficient axial width to contain an index ball 280, which is held in the recess by spring clip 282. The clockwise end 284 of the recess is the return stop for ball 280 and the ball rests against this stop when the assembly is in the rest position $a$. This is illustrated in FIG. 10. The counterclockwise end 286 of recess 276 provides a full apply stop against which the ball is positioned when position $f$ is reached as described below. A port 288 extends radially through the inner valve member 176 to provide fluid communication between bores 178 and 180. Port 288 is positioned somewhat clockwise of recess 276 and is in full fluid communication with port 236 when the assembly is at the rest position $a$.

The valve assembly position $b$ of FIGS. 7 through 10 is the initial apply position. The valve assembly position $c$ of these FIGURES is the runout position. The changes in the relative positions of the valving between positions $b$ and $c$ are those which normally occur when the hydraulic pressure generated by pump 36 is being metered to the power chamber 80 as desired for normal brake booster operation. The runout position $c$ is usually a momentary position, with further movement of the input member 136 by push rod 20 causing the valve assembly to move to position $d$ of FIGS. 7 through 10. In this position the pump is bypassed to the power steering gear.

Slight additional movement causes the valve members to assume position $e$ of FIGS. 7 through 10 in which the accumulator is opened to provide metered accumulator pressure to the power chamber 80. This pressure is metered by the close relationship of the left edge of bevel 264, as seen in FIG. 7, and the right edge of the inner portion of port 234, after the bevel has cammed ball valve 258 radially outward to open valve seat 254. The assembly assumes position $f$ of FIGS. 7 through 10 when there is no pump pressure or accumulator pressure to the brake booster assembly, the pump pressure being fully bypassed to power steering. This is also the index stop position of ball 280 against stop 286. This position is maintained during manual pushthough.

Although the input member and the power piston valve drive extension are not shown in FIGS. 7 through 10, it can be appreciated that movement of the input member results in clockwise movement of the inner rotary valve member during brake apply, and clockwise movement of the outer valve member occurs at a different rate during brake apply movement of the extension 160. In order to provide a better comparison of the elements, the clockwise movement of the outer valve member as it progresses from position $a$ through position $f$ has not been illustrated, all of the actual movements being provided by an indication of movement of the inner valve member clockwise in relation to the outer valve member.

Assuming that the vehicle in which the assembly is installed is operating in a normal manner, pump 36 is providing fluid flow through the closed circuit schematically illustrated as including conduit 42, the valve assembly 60, conduit 46, the power steering gear 40, conduit 54, sump 38, and conduit 56. The flow entering inlet port 44 enters chamber 196, passes through slot port 232 into channel 270, and out of slot port 230 into chamber 194. It then passes through outlet port 48 to conduit 46 and the power steering gear. The power steering gear is also an open center valve type so that flow continues through it in a somewhat similar manner. It is noted that the power chamber 80 is connected through bore 180 to the sump 38 through ports 288 and 236, chamber 204, outlet port 52 and conduit 50. The charged accumulator pressure is at port 200 and in chamber 198. This chamber is closed in relation to the power chamber 80 because ball valve 258 remains seated.

When the booster is initially applied, the operator depresses the brake pedal lever 18, causing it to pivot about pivot 22 to move input push rod 20 linearly to the left as seen in FIGS. 1 and 2. This causes the input member 136 to move leftwardly toward the power piston wall 86. Resistance to this movement occurs due to the action of springs 144 and 98, as well as resistance to movement of the output push rod by the master cylinder. Some movement occurs, however, and the inner rotary valve member 176 is driven clockwise as seen in FIG. 2 and in FIGS. 7 through 10. The valve assembly 68 therefore changes from position *a* to position *b* of FIGS. 7 through 10. There is no effective change in the accumulator release valve portion illustrated in FIG. 7 (b), although port 262 moves clockwise relative to port 234. The portion of the valve assembly connected to the power steering gear through outlet port 48, illustrated in FIG. 8, is operationally modified. The edge 290 of channel 270 moves partially across slot port 230, restricting the outward flow of fluid from the booster and valve assembly. This causes a pressure increase upstream of this point of restriction, generating hydraulic pressure in channel 270, slot port 232, and chamber 196. As seen in FIG. 9 (b), channel 270 has its left edge 290 positioned at approximately the midpoint of slot port 232. Also, port 274 has its right edge 292 incipiently opening port 274 to port 232. When the increased pressure is manifested in chamber 196 and port 232, slight additional movement of the inner valve member 176 causes a metering action to take place between ports 232 and 274, with metered pressure passing into bore 180 through port 274, and then into the power chamber 80. This pressure acts against the effective area of the power piston assembly 82 exposed to chamber 80, causing the piston assembly to move leftwardly as seen in FIG. 2 in a brake applying direction. Extension 160 moves leftwardly since it is a part of the power piston assembly, driving the outer rotary valve member 174 in a clockwise direction. Due to the difference in radius of outer valve drive member 240 as compared to inner valve drive member 242, the outer rotary valve member 174 will move arcuately a slightly less distance than the inner rotary valve member has moved even though the input member 136 and the valve drive extension 160 moved linearly the same amount. This will cause a slight relative movement of the two rotary valve members tending to further restrict the metering area defined by ports 232 and 274, stabilizing the amount of active pressure in the power chamber 80 in accordance with the amount of movement of the input member 136. This type of action will continue to occur within the limits of the pressure available and the movements of the input member 136 and valve drive extension 160. Since port 262 keeps ball valve 258 exposed to booster actuating pressures, the valve will open when those pressures exceed the accumulator charge pressure, thus increasing the charge pressure to the highest attained actuating pressure. The force of spring clip 260 is relatively slight and has no appreciable effect on the pressure differential between the power chamber pressure and the pressure in the accumulator. It will be noted that upon initial apply, the portion of the valve assembly connected to exhaust through sump port 52 is closed off in order to permit a buildup of pressure in the power chamber 80. This is accomplished by the movement of port 288 clockwise relative to port 236, as indicated in FIG. 10 (b). Ball 280 is then positioned at a point intermediate ramp ends 284 and 286.

If the booster assembly is actuated until booster runout is attained, the valve assembly outer and inner rotary valve members 174 and 176 will assume the position *c* of FIGS. 7 through 10. Although bevel edge 264 of port 262 has more closely approached ball valve 258 there is no effective change in the accumulator release valve portion shown in FIG. 7. The flow from the valve assembly to the power steering gear is momentarily interrupted as indicated in FIG. 8 (c). As can be seen, channel 270 is no longer in fluid communication with port 230. However, port 268 is incipiently in fluid communication with port 230. The exhaust portion shown in FIG. 10 remains closed, ball 280 having merely moved slightly nearer the full apply stop 286 of ramp 278. Port 274 of the pump connection portion shown in FIG. 9 has moved sufficiently far to fully connect the pump with the power chamber through ports 232 and 274, and bore 180. The relationship of the valve assembly elements in runout position *c* is only a momentary relationship. The vehicle operator, in trying to obtain additional braking force, will continue to move the pedal lever in the brake actuating direction, causing the valve assembly to assume position *d* of FIGS. 7 through 10. In this position the pump pressure and flow is directed to the power steering gear via bore 180 and restrictive port 268 while the power chamber exhaust remains closed. As shown in FIG. 9 (d), pump pressure and flow passes through the relatively fully opened ports 232 and 274 and into bore 180 and power chamber 80. As is seen in FIG. 8(d), the fluid flows outwardly through port 268 and port 230 to the power steering gear through chamber 194 and outlet port 48. However, port 268 is a restrictive port so that it maintains some pressure on the power piston even though the booster assembly has reached the runout condition. Meanwhile the beveled edge 264 of port 262 in the accumulator release valve portion shown in FIG. 7 is at the point of engagement with ball valve 258 so that a slight amount of further movement toward position *e* will open that valve.

Slight additional movement of the input member 136 allows that additional amount of movement of the inner rotary valve member 176 to occur, and beveled edge 264 cams ball valve 258 away from its valve seat 254, opening port 234 into port 262. The beveled edge 264 cooperates with the inner end of port 234 to meter the pressure from the charged accumulator into bore 180 through port 262. This controls the apply pressure from the accumulator into the power chamber 80. Meanwhile, port 268 has moved clockwise relative to port 230, closing off the fluid communication between bore 180 and the power steering gear. This prevents the accumulator pressure from being delivered to the power steering gear. Port 274 has also moved so that it is no longer in fluid communication with port 232, thereby closing the fluid connection from the pump to bore 180 through chamber 196 and port 232 and 274. This prevents the accumulator pressure from being delivered in a direction toward the pump. If the pump is still putting out some pressure, the pressure is transmitted from chamber 196 through port 272 to channel 270, which has moved into fluid communication with port 272. This is illustrated in FIG. 9 (a). The channel 270 is also in fluid communication with port 266 as seen in FIG. 8 (e). Therefore any pressure from the pump which might be available is transmitted to the power steering gear while bypassing the entire brake booster.

If the brake is then released after using some accumulator pressure, the valve assembly returns to position d of FIGS. 7 through 10, and the pressure in the power chamber is dumped to the power steering gear through bore 180, ports 268 and 230, chamber 194, outlet port 48, and conduit 46. Beveled edge 264 moves so that spring clip 260 reseats ball valve 258 in its seat 254, closing off the accumulator.

When there is no additional pump pressure and no accumulator pressure remaining, and the booster assembly must be actuated manually in a push-through manner to operate the master cylinder, the valve assembly assumes position f of FIGS. 7 through 10 by further movement of input member 136. The ball 280 is positioned against its stop 286, limiting any further relative movement of the inner and outer rotary valve members. The line of communication from the pump continues to be fully bypassed to the power steering gear as shown in FIGS. 8 (f) and 9 (f). The portion of the inner rotary valve member 176 adjacent bevel edge 264 holds ball valve 258 away from its valve seat 254. The opening between the inner end of port 234 and the outer end of port 262 is very restricted. If movement of the power steering gear occurs due to a partial operation of the pump 36, the back pressure created by the power steering gear will be transmitted through conduit 46 and outlet 48 to chamber 198. The back pressure will pass through open valve seat 254 and into bore 180 and power chamber 80 through port 262. This will cause a pressure to be applied to the power piston, tending to apply the brake and manifesting its existence by a pedal pumping effect which can be sensed by the vehicle operator.

It will be noted that once position f is reached, any further movement of the input member 136 results in concurrent arcuate movement of both rotary valve members 174 and 176 through stop 286 and ball 280. Therefore any necessary amount of manual push-through operation can be obtained without affecting the relationship of the two valve members. When the brake is released and input member 136 and valve drive extension 160 move rightwardly as seen in FIG. 2 the valves merely pass through positions e, d, c, b and a so that the assembly is again at the rest position with the rotary valve members having the same relative valve position as before.

When manual push-through occurs, the lock piston assembly is actuated. As can be seen in normal operation the hydraulic fluid in chamber 132 changes slightly in volume due to relative movement of the input member 136 and the power piston 84. These volume changes are taken care of by permitting the fluid to pass through face seal 124 and face valve 122, through relay passages 294 formed in the outer surface of lock piston 112 and into the power chamber 80. When manual push-through is required, the flow of fluid out of chamber 132 is prevented to minimize the amount of lost travel of the input member 136 before it abuts wall 86 to establish a mechanical force path through the booster assembly.

During manual push-through after index ball 280 is resting against stop 286, movement of the input member 136 drives the inner rotary valve member 176 through drive member 242, which in turn drives the outer rotary valve member through stop 286 and ball 280. This causes the valve drive extension 160 to be driven forwardly against the force of the relatively light lock valve return spring 128 until face valve 122 engages face seal 124. Slight additional movement of the input member results in some slippage at one or both of the valve drive members since the valve drive extension and lock piston can move no further. Such additional movement also slightly increases the fluid pressure in chamber 132 due to the intrusion of the input member forward end 134 into the sealed chamber. This pressure increase causes the face seal ring and the lock piston to move rearwardly until the lock piston engages ring 116. The pressure in chamber 132 holds the face valve closed against the seal. This rearward movement of the lock piston 112 and the valve drive extension 160 is permitted by further slip of the valve drive members while the index ball 280 remains in position against stop 286. At this point the fluid chamber 132 is trapped against further displacement of the lock piston and further force exerted against the input member 136 results in a mechanical force path exerted through the trapped fluid to power piston 84. This locking arrangement lessens the amount of lost pedal travel which would occur without it.

Upon brake release, the input member 136 moves rearwardly and there is a pressure drop in the lock chamber 132. The face seal ring 124 is moved away from the face valve 122 of the lock piston by return spring 128 and all of the pressure in the lock chamber 132 relative to the pressure in the power chamber 80 is relieved so that the pressures are equalized. Spring 128 will return the lock valve face seal ring 124 to the position shown in FIG. 2 and chamber 132 is once again in fluid communication with chamber 80 through the relief passages 294.

During manual brake apply, the power chamber 80 is effectively sealed against the entrance of hydraulic fluid. Since the input member 136 and the power piston assembly 82 move the same distance, and the input member has a considerably smaller effective area than the power piston assembly, the volume of the power chamber 80 increases with stroke. This can be detrimental to operation of the brake system if replacement fluid is not allowed to enter. Therefore the seal 220 acts in its valve capacity for this purpose. This side wall 222 forming a part of land 190 is provided with sufficient clearance relative to the wall of bore 170 to permit fluid to flow from chamber 204 to chamber 206 when the seal moves rightwardly as seen in FIG. 5 and no longer seals the circumferential area between side wall 222 and the wall of bore 170. It is contemplated that seal 220 may be made of a hard material such as nylon so that it is capable of sealing the land and bore wall when it is in its leftward position against the side wall 222 without being damaged due to extrusion. When there is a positive pressure in the power chamber 80 and bore 180, the pressure also exists in chamber 206. Since the pressure is greater than the sump pressure in chamber 204, it will normally hold seal 220 in the sealing position against side wall 222.

A point of interest is that the travel ratio of input member 136 relative to output member 92 is controlled by the ratio of the diameters of the outer drive member 240 and the inner drive member 242. By changing the diameter of drive member 242, for example, different travel ratios may be provided to tailor units to different installations. Gears can be used instead of the friction drives between members 164 and 240, and members 166 and 242, provided the gears and the elements to which they are attached are positioned in proper timing and a continuous release to power steering is provided in the porting to permit a full manual apply. The friction drive arrangement is the preferred one, however, since it is self-aligning so as to require no special timing relationship during assembly, and no such porting release is needed.

What is claimed is:

1. A hydraulic booster comprising:
   a housing having an axially extending power section and a transversely extending valve section, and a bore in each of said sections, said bores having axes in skew relation and said bores intersecting each other;
   a power piston reciprocably received in said power section bore and dividing said power section bore into a variable pressure power chamber and an unpressurized chamber, said housing including an apertured power section bore end wall closing said power chamber with said valve section bore intersecting said power section bore in said power chamber, with power piston having a valve friction drive extension in said power chamber and formed with first friction drive surface means extending in a plane axially parallel to said power section bore axis and transversely parallel to said valve section bore axis;
   an input control member extending reciprocably through said apertured end wall in sealing relation therewith and into said power chamber and having a friction drive section in said power chamber formed with second friction drive surface means extending axially parallel to said power section bore axis and transversely parallel to said valve section bore axis and in a plane parallel to and spaced from the plane of said first friction drive surface means; said housing valve section having parts connecting with said valve section bore in axially spaced relation and including ports adapted to be respectively connected with a source of hydraulic pressure and exhaust means;
   and rotary spool valve means in said valve section bore, said valve means having first circumferential friction surface means frictionally engaging said first friction drive surface means and second circumferential friction surface means coaxial with said first circumferential friction surface means and frictionally engaging said second friction drive surface means, a plurality of spaced lands cooperating with said valve section bore to define therewith chambers respectively communicating with said ports, a center passage in said valve means communicating with said power chamber, and variable orifices in said valve means fluidly between said ports and said center passage and controlled by rotary movements of said valve means caused by linear movements of said power piston extension and said input control member to control the introduction and containment and removal of fluid pressure in said power chamber to actuate and hold and release the booster in accordance with movements of said input control member.

2. In a hydraulic power booster having an input member and an output member and a power piston connected to move said output member, said members and said power piston being movable linearly during booster operation:
   a valve assembly for controlling the application of hydraulic fluid pressure to a power side of said power piston in accordance with the linear movements of said input member and said power piston, said valve assembly comprising:
   a housing having a first bore therein defined by a first cylindrical wall,
   a first sleeve valve rotatably mounted in said housing bore and having a second bore therein defined by a second cylindrical wall,
   a second sleeve valve rotatably mounted in said second bore and having a third bore therein in continuous fluid communication with the power side of said power piston,
   said first sleeve valve having a plurality of lands axially spaced therealong and sealingly engaging said first cylindrical wall and defining therewith a plurality of axially spaced chambers in said housing bore,
   said housing having a plurality of axially spaced ports therein each in communication with one of said chambers,
   a plurality of first valve ports in said first sleeve valve each being axially intermediate and adjacent pair of said lands and communicating the associated one of said chambers defined by said lands with said second bore in rotationally timed relationships,
   a plurality of second valve ports in said second sleeve valve and communicating said second and third bores in rotationally timed relationships with said first valve ports to selectively open and close and modulate the fluid communications between various ones of said housing axially spaced ports and said first and second valve ports and said first and second and third bores in accordance with the rotational movements of said first and second sleeve valves in relation to each other and to said housing;
   and means movable with said input member and said power piston and rotating said first and second sleeve valves in arcuately different amounts of movements as said input member is moved to control the application and release of hydraulic fluid pressure to said power piston.

3. In a hydraulic power booster having a movable input member, a power piston assembly including a power piston actuated by hydraulic pressure, and a movable output member connected with said piston to be moved thereby, a control valve assembly for controlling hydraulic pressure applied to said power piston to move said output member under hydraulic pressure, said control valve assembly comprising:

a fixed valve housing having first and second valve elements therein in valving relation to each other, relative movements of said valve elements relative to each other but not to said valve housing controlling the hydraulic pressure acting on said power piston;

each of said valve elements having friction drive means thereon with the friction drive means of one of said valve elements being in friction driving engagement with said input member and the other of said valve elements having another friction drive means in friction driving engagement with said power piston assembly;

and valve element indexing means joining said valve elements and indexing said valve elements relative to each other in a predetermined valving relationship when the power booster is in the rest position and permitting indexed valving movement of said valving elements by the driving relationships established through said friction drive means to a predetermined valving position obtained by a predetermined amount of relative movement of said valve elements and locking said valve elements thereafter against further relative movement, at least one of said friction drive means slipping with any further brake applying movement of said input member and said power piston assembly so as to retain said valve elements in indexed relation during such further brake applying movement.

4. A hydraulic power booster comprising:
a movable input member;
a power piston assembly including a power piston actuated by hydraulic pressure;
a movable output member connected with said piston to be moved thereby;
and a control valve assembly for controlling hydraulic pressure applied to said power piston to move said output member under hydraulic pressure, said control valve assembly comprising:

a fixed valve housing having first and second valve elements therein in valving relation to each other, relative movements of said valve elements relative to each other but not to said valve housing controlling the hydraulic pressure acting on said power piston;

each of said valve elements having friction drive means thereon with the friction drive means of one of said valve elements being in friction driving engagement with said input member and the other of said valve elements having another friction drive means in friction driving engagement with said power piston assembly;

and valve element indexing means joining said valve elements and indexing said valve elements relative to each other in a predetermined valving relationship when the power booster is in the rest position and permitting indexed valving movement of said valving elements by the driving relationships established through said friction drive means to a predetermined valving position obtained by a predetermined amount of relative movement of said valve elements and locking said valve elements thereafter against further relative movement, at least one of said friction drive means slipping with any further brake applying movement of said input member and said power piston assembly so as to retain said valve elements in indexed relation during such further brake applying movement;

said power piston assembly having a hydrauliic lock assembly including a normally open hydraulic lock chamber formed therein and means for closing said hydraulic lock chamber to trap hydaulic fluid therein and establish a mechanical force transmission path from said input member to said output member through said trapped fluid and said power piston, said closing and trapping means including a lock valve moved to the closed position by a valve closing force transmitted through one of said valve drive means to one of said valve elements and through said valve element indexing means to the other of said valve elements and through said other friction drive means to said closing and trapping means, said predetermined valving position of said control valve elements then being established.

* * * * *

UNITED STATES PATENT AND TRADEMARK OFFICE
CERTIFICATE OF CORRECTION

PATENT NO. : 3,898,914
DATED : August 12, 1975
INVENTOR(S) : Ronald L. Shellhause It is certified that error appears in the above-identified patent and that said Letters Patent are hereby corrected as shown below:

Column 2, line 23, after "rod" insert the number -- 20 --.
Column 4, line 61, the word "rotaty" should read -- rotary --.
Column 4, line 66, the word "groovves" should read -- grooves --.
Column 5, line 53, the number "230" should read -- 238 --.
Column 8, line 45, the word "though" should read -- through --.
Column 11, line 9, the word "FIG. 9 (a)" should read
-- FIG. 9 (e) --.
Column 13, line 35, the word "with" should read -- said --.
Column 13, line 50, the word "parts" should read -- ports --.

Signed and Sealed this twenty-third Day of December 1975

[SEAL]

Attest:

RUTH C. MASON
Attesting Officer

C. MARSHALL DANN
Commissioner of Patents and Trademarks